United States Patent
Berg et al.

(10) Patent No.: US 10,812,627 B2
(45) Date of Patent: Oct. 20, 2020

(54) FRONTEND PROCESS MINING

(71) Applicant: SAP SE, Walldorf (DE)

(72) Inventors: Gregor Berg, Berlin (DE); Andre Niklas Wenz, Berlin (DE); Bernhard Hoeppner, Berlin (DE); Frank Feinbube, Potsdam (DE); Florian Moritz, Potsdam (DE); Florian Haupt, Potsdam (DE)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 16/293,399

(22) Filed: Mar. 5, 2019

(65) Prior Publication Data

US 2020/0287992 A1 Sep. 10, 2020

(51) Int. Cl.
*G06F 15/16* (2006.01)
*H04L 29/08* (2006.01)
*H04L 29/06* (2006.01)

(52) U.S. Cl.
CPC ............. *H04L 67/36* (2013.01); *H04L 67/42* (2013.01)

(58) Field of Classification Search
USPC ........................................................ 709/218
See application file for complete search history.

(56) References Cited

U.S. PATENT DOCUMENTS

| | | | | |
|---|---|---|---|---|
| 7,162,458 B1* | 1/2007 | Flanagan | ............... | G06Q 30/00 705/80 |
| 7,616,960 B2* | 11/2009 | Anke | ................... | H04W 72/10 370/235 |
| 7,694,307 B2* | 4/2010 | Kraiss | .................... | G06Q 30/02 718/106 |
| 7,861,260 B2* | 12/2010 | Shkedi | ............... | G06Q 30/0251 725/34 |
| 8,150,871 B2* | 4/2012 | Klensch | .................. | G06F 16/24 707/770 |
| 8,407,081 B1* | 3/2013 | Rajasenan | .......... | G06Q 10/0639 705/7.42 |
| 8,583,678 B2* | 11/2013 | Vainer | ................. | G06F 16/2428 707/769 |

(Continued)

OTHER PUBLICATIONS van der Aalst, Wil M.P., Process Mining: Discovering and Improving Spaghetti and Lasagna Processes, Apr. 11-15, 2011, IEEE, 2011 IEEE Symposium on Computational Intelligence and Data Mining (CIDM), pp. 1-7. (Year: 2011).*

(Continued)

*Primary Examiner* — Alicia Baturay
(74) *Attorney, Agent, or Firm* — Schwegman Lundberg & Woessner, P.A.

(57) ABSTRACT

An application server provides an application or set of applications to one or more client devices. One or more users of the client devices interact with the applications to perform a business process. Data is stored on one or more of the client devices that tracks user interactions with the application. The data is transmitted from the client devices to the application server for analysis. Data from multiple client devices is correlated to enable analysis of a complex business process. As a result of the analysis, bottlenecks may be identified based on a particular process step taking a long time to complete or receiving repeated re-entry of data. The solution is automated and scalable, allowing for analysis of an entire business process landscape.

20 Claims, 12 Drawing Sheets

(56) References Cited

U.S. PATENT DOCUMENTS

| | | | |
|---|---|---|---|
| 9,082,107 B2* | 7/2015 | Cheung | G06Q 50/18 |
| 9,164,990 B2* | 10/2015 | Vainer | G06F 16/00 |
| 9,171,851 B2* | 10/2015 | Matichuk | B60P 3/34 |
| 9,213,954 B2* | 12/2015 | Khalatov | G06Q 10/063118 |
| 9,218,189 B2* | 12/2015 | Vainer | G06F 9/452 |
| 9,245,245 B2* | 1/2016 | Sherman | G06Q 10/10 |
| 9,786,075 B2* | 10/2017 | Aguera-Arcas | G06T 15/205 |
| 10,360,193 B2* | 7/2019 | Sarkar | G06F 16/285 |
| 10,558,686 B2* | 2/2020 | Drushku | G06F 16/285 |
| 2002/0087661 A1* | 7/2002 | Matichuk | H04N 21/00 709/218 |
| 2002/0129342 A1* | 9/2002 | Kil | G06F 16/2465 717/137 |
| 2005/0171833 A1* | 8/2005 | Jost | G06Q 10/06 705/7.38 |
| 2006/0184410 A1 | 8/2006 | Ramamurthy et al. | |
| 2009/0043637 A1 | 2/2009 | Eder | |
| 2015/0213392 A1 | 7/2015 | Kittur et al. | |
| 2017/0228119 A1 | 8/2017 | Hosbettu et al. | |
| 2018/0011930 A1* | 1/2018 | Azaria | G06F 16/2465 |
| 2019/0155894 A1 | 5/2019 | Gandhi et al. | |
| 2019/0171513 A1 | 6/2019 | Purushothaman | |
| 2020/0005248 A1* | 1/2020 | Gerzi | G06Q 10/1095 |

OTHER PUBLICATIONS van der Aalst, Wil M.P. et al., Process Mining Put into Context, Jan.-Feb. 2012, IEEE, IEEE Internet Computing, vol. 16, No. 1, pp. 82-86. (Year: 2012).*

Saylam, R. et al., Process Mining in Business Process Management: Concepts and Challenges, Nov. 7-9, 2013, IEEE, 2013 International Conference on Electronics, Computer and Computation (ICECCO), pp. 131-134. (Year: 2013).*

"SAP Process Mining by Celonis 4.0—Manual", Celonis GmbH, (2016), 108 pgs.

"U.S. Appl. No. 16/447,033, Non Final Office Action dated Jun. 8, 2020", 29 pgs.

* cited by examiner

MINED DATA TABLE (400, 410)

| OBJECT ID | CLIENT ID | USER ID | EVENT TYPE ID | DURATION | CLICKSTREAM |
|---|---|---|---|---|---|
| 1 | 101 | 1001 | 1 | 30 | |
| 1 | 102 | 1002 | 2 | 1440 | |
| 1 | 101 | 1003 | 3 | 90 | |
| 2 | 103 | 1001 | 4 | 17 | |

BUSINESS OBJECT TABLE (440)

| OBJECT ID | OBJECT TYPE |
|---|---|
| 1 | INVOICE |
| 2 | CUSTOMER |

EVENT TYPE TABLE (470)

| EVENT TYPE ID | EVENT DESCRIPTION |
|---|---|
| 1 | CREATE INVOICE |
| 2 | CHANGE BASELINE DATE |
| 3 | PAY INVOICE |
| 4 | CHANGE ADDRESS |

PROCESS TYPE TABLE (510)

| OBJECT TYPE (520) | PROCESS TYPE |
|---|---|
| INVOICE (530A) | ACCOUNTS RECEIVABLE |
| CUSTOMER (530B) | CUSTOMER MANAGEMENT |

USER TABLE (540)

| USER ID (550) | USER NAME |
|---|---|
| 1001 (560A) | COLLYER, BUD |
| 1002 (560B) | REEVES, GEORGE |
| 1003 (560C) | REEVE, CHRISTOPHER |

*FIG. 5*

```
                       ┌─ 800
CREATE MTO STANDARD ORDER ── 805

QUOTATION:    | 20000004
   810            815

MTO STANDARD ORDER | CBM0         NET VALUE: | 353.50 | USD
   820               825            830        835      840

SOLD-TO PARTY: | 1710005 | DOM. US CUSTOMER 5 (CMS) / 1000 2ND AVE N / BILLINGS MT 59101-2614
   845            850        855

SHIP-TO PARTY: | 1710005 | DOM. US CUSTOMER 5 (CMS) / 1000 2ND AVE N / BILLINGS MT 59101-2614
   860            865        870

CUST. REFERENCE: | CR1709011
   875               880

REQ. DELIV. DATE | 12/21/2017
   885              890
```

*FIG. 8*

ORDER PROCESS ANALYSIS — 1200, 1210

| USER INTERFACE | TIME% | REWORK% |
|---|---|---|
| MANAGE SALES ORDERS | 20% | 2% |
| CREATE SALES ORDER | 30% | 16% |
| CREATE MTO STANDARD ORDER | 28% | 7% |
| CREATE MTS STANDARD ORDER | 12% | 4% |
| CLOSE INVOICE | 10% | 1% |

*FIG. 11*

FRONTEND PROCESS MINING

TECHNICAL FIELD

The subject matter disclosed herein generally relates to frontend process mining. Specifically, the present disclosure addresses systems and methods to gather, analyze, and use data related to frontend processes.

BACKGROUND

Process mining connects field changes logged in a software system's database with the business processes that are executed in the software system. Process mining operates on server-side data and derives process graphs from the server-side data to determine the time between activities in the process.

User interface (UI) interactions of individual users of websites are tracked in isolation and analyzed as cohorts.

BRIEF DESCRIPTION OF THE DRAWINGS

Some embodiments are illustrated by way of example and not limitation in the figures of the accompanying drawings.

FIGS. 4-5 are a block diagram of a database schema, according to some example embodiments, suitable for frontend process mining.

FIG. 8 is a diagram of a UI in a process suitable for frontend process mining, according to some example embodiments.

FIG. 11 is a diagram of a UI for displaying results of frontend process mining, according to some example embodiments.

DETAILED DESCRIPTION

Figure 1:
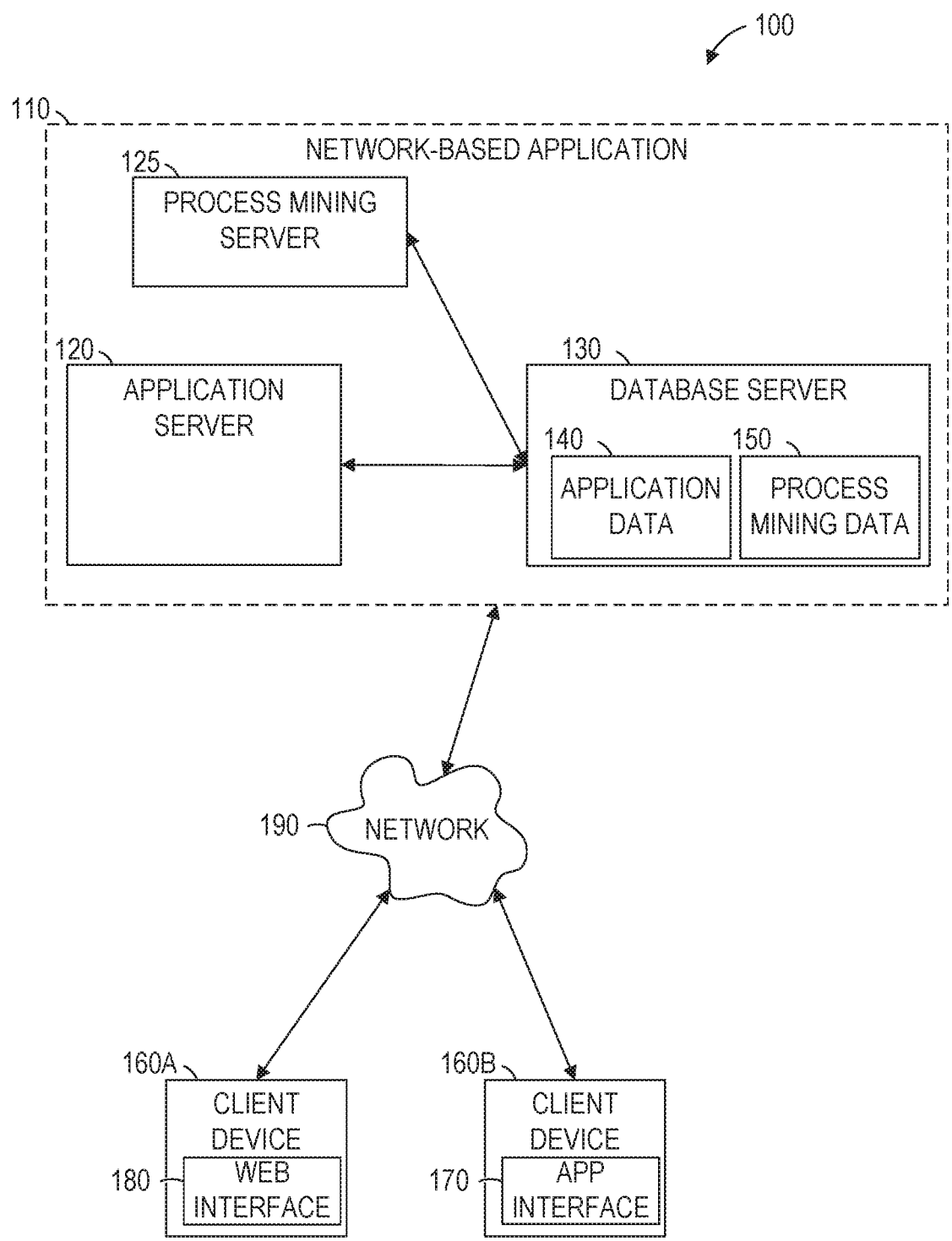
FIG. 1 is a network diagram illustrating a network environment suitable for frontend process mining, according to some example embodiments.

Example methods and systems are directed to frontend process mining. An application server provides an application or set of applications to one or more client devices. One or more users of the client devices interact with the applications to perform a business process. For example, in an accounts receivable process, a first user uses a first UI to enter data for a customer who can pay invoices; a second user uses a second UI to generate an invoice to be paid by the customer; and a third user uses a third UI to enter data for a received payment.

Data is stored on one or more of the client devices that tracks user interactions with the application. In some example embodiments, the time, location and UI element of each mouseclick and keypress are stored. The data is transmitted from the client devices to the application server for analysis. Data from multiple client devices is correlated to enable analysis of a complex business process. As a result of the analysis, bottlenecks may be identified based on a particular UI taking a long time to complete or receiving repeated re-entry of data. The solution is automated and scalable, allowing for analysis of an entire business process landscape.

Each time a user opens an application, the application identifies a type of business object being worked on to identify the business process. For example, if the user is working on a specific invoice with identifier 12314, the UI of the application will include the string "Invoice 12314" somewhere. Thus, each UI can be analyzed to determine if the word "Invoice" followed by a number is present and the business object identified accordingly. As another example, if the user is working on a specific customer with identifier 54321, the UI of the application will include the string "Customer 54321" somewhere. Thus, the frontend process mining system can determine both if the business object being worked on is a Customer or an Invoice as well as the specific business object being worked on. The step of the business process is identified based on the name of the application and the changes performed by the user. The completion of the process step is determined based on specific UI elements interacted with by the user (e.g., a "submit" or "save" button).

In response to completion of a process step or at a predetermined time (e.g., once per hour), the client device sends the frontend process mining data to the application server for analysis. Based on an analysis of the frontend process mining data, the application server generates a report. For example, the report may be an alert generated for an administrator in response to a determination that a business process is experiencing a high rate of data re-entry (e.g., a rate that exceeds a predetermined threshold), which may indicate a confusing UI, that a set of newly-hired employees are having difficulty with the UI and need additional training, or any suitable combination thereof.

By comparison with existing methods of process mining, the methods and systems discussed herein improve the ability of the process mining to identify problems in a business process. Frontend process mining enables the collection of data previously unavailable to backend process mining. By using this additional data, specific problems within a UI may be identified instead of merely identifying an issue with a UI as a whole. Additionally, by linking together data from multiple UIs that impact a single business object, interrelationships between UIs may be determined. For example, by differentiating different steps that occur in a single UI, the different steps are correlated to the state of the process instance separately, ensuring that the UI interactions are clustered by the state of the process rather than the UI that happens to be used to perform the different steps. These interrelationships are unavailable to standard backend process miners. For example, when process steps are executed on devices that do not report data for backend process mining, those process steps cannot be analyzed to determine issues with the process.

When these effects are considered in aggregate, one or more of the methodologies described herein may obviate a need for certain efforts or resources that otherwise would be involved in process mining. Computing resources used by one or more machines, databases, or networks may similarly be reduced. Examples of such computing resources include processor cycles, network traffic, memory usage, data storage capacity, power consumption, and cooling capacity. Additionally, backend process mining includes the mapping of cryptic field changes to human-readable activity names. Since frontend process mining works in the frontend, which is already intended for human consumption, frontend process mining can avoid the expensive manual effort of setting up the mapping. Further, since the mapping step used in backend process mining is avoided, computing resources such as processor cycles, memory usage, and power consumption expended in performing the mapping are saved.

FIG. 1 is a network diagram illustrating a network environment 100 suitable for frontend process mining, according to some example embodiments. The network environment 100 includes a network-based application 110, client devices 160A and 160B, and a network 190. The network-based application 110 is provided by an application server 120 in communication with a database server 130, storing application data 140 and process mining data 150. The processes provided by the application server 120 are monitored by the process mining server, also in communication with the database server 130. The application server 120 accesses the application data 140 to provide an application to the client devices 160A and 160B via a web interface 180 or an application interface 170. The application server 120, the database server 130, and the client devices 160A and 160B may each be implemented in a computer system, in whole or in part, as described below with respect to FIG. 12. The client devices 160A and 160B may be referred to collectively as client devices 160 or generically as a client device 160.

The process mining server 125 receives data from the client devices 160 regarding user interactions with the application. The received data is provided to the database server 130 for storage as the process mining data 150. The process mining data 150 is analyzed by the process mining server 125 to identify problems in a business process being performed using the application. In response to identifying a problem in a business process, a report is generated (e.g., for provision to a Digital Transformation Officer).

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
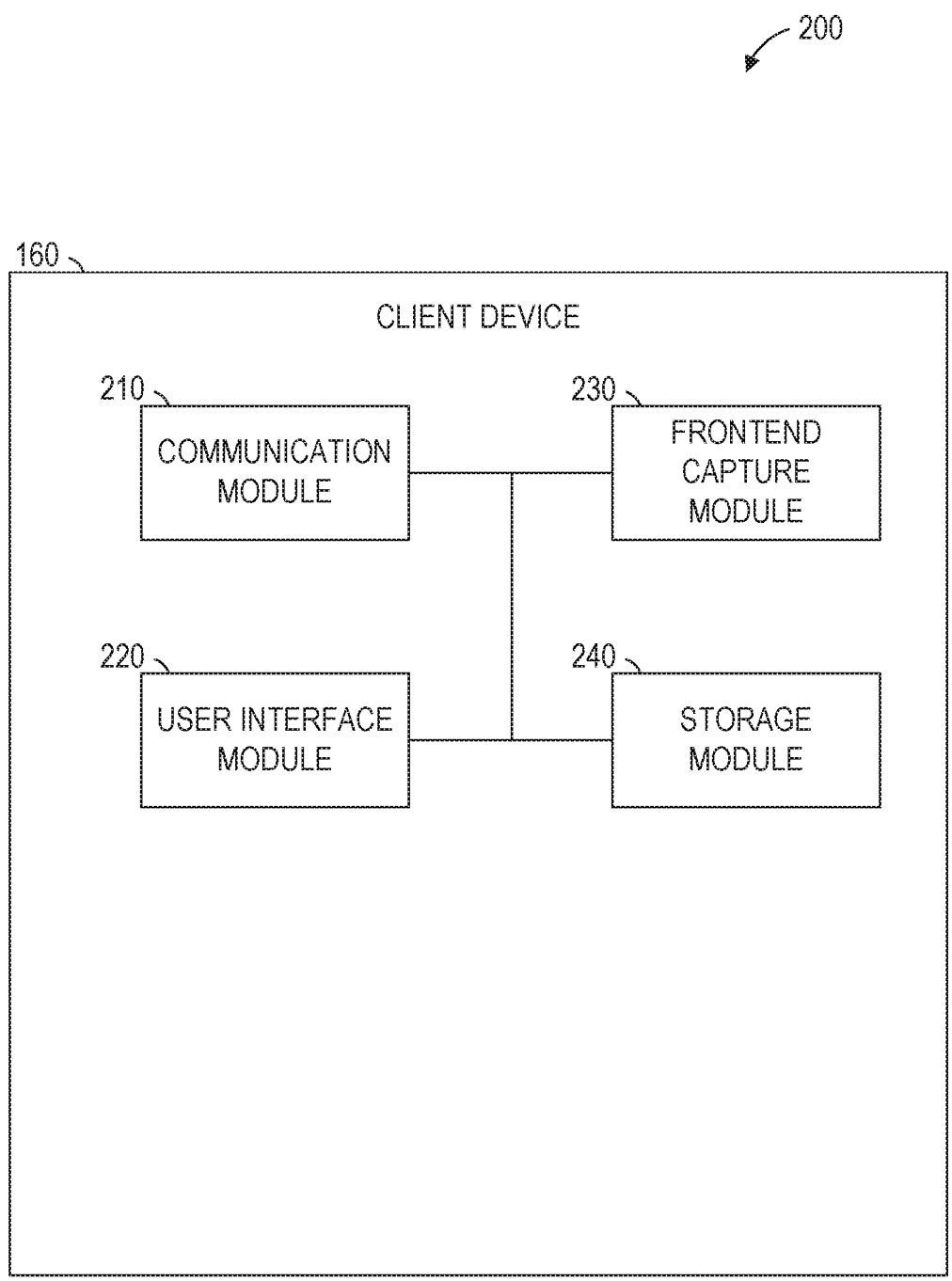
FIG. 2 is a block diagram of a client device, according to some example embodiments, suitable for frontend process mining.

FIG. 2 is a block diagram 200 of a client device 160, according to some example embodiments, suitable for frontend process mining. The client device 160 is shown as including a communication module 210, a UI module 220, a frontend capture module 230, and a storage module 240, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the client device 160 and transmits data from the client device 160. For example, the communication module 210 may receive, from the application server 120, data (e.g., a hypertext markup language (HTML) file) for a selected application. The communication module 210 provides the data to the UI module 220. The UI module 220 causes a UI for the application to be displayed on a display device integrated into or connected to the client device 160. The UI module 220 may receive from the application server 120 instructions (e.g., an executable or interpreted file or data) that, when executed by the client device 160, cause the client device 160 to perform operations. The operations include displaying a UI for performing a task of a business process, storing a timestamp for each user interaction with the UI, and transmitting the user interaction data to the application server 120.

The frontend capture module 230 gathers data regarding user interactions with the UI and stores the gathered data on a storage device of the client device 160 via the storage module 240. In response to a request from the application server 120, the frontend capture module 230 retrieves the stored data and transmits the stored data to the application server 120 via the communication module 210. In alternative embodiments, the process mining data is sent to the application server periodically (e.g., once per minute or once per hour) or in response to a particular interaction with the UI (e.g., detecting that a button was pressed that indicates that data entry is complete). In some example embodiments, the frontend capture module 230 is implemented as a JavaScript client that periodically transmits JavaScript object notation (JSON) JSON-formatted data to the application server 120. In other example embodiments, the process mining module 230 is implemented as a browser plugin. User-identifying data may be stripped from the process mining data by the frontend capture module 230 before the data is transmitted to the application server 120.

Figure 3:
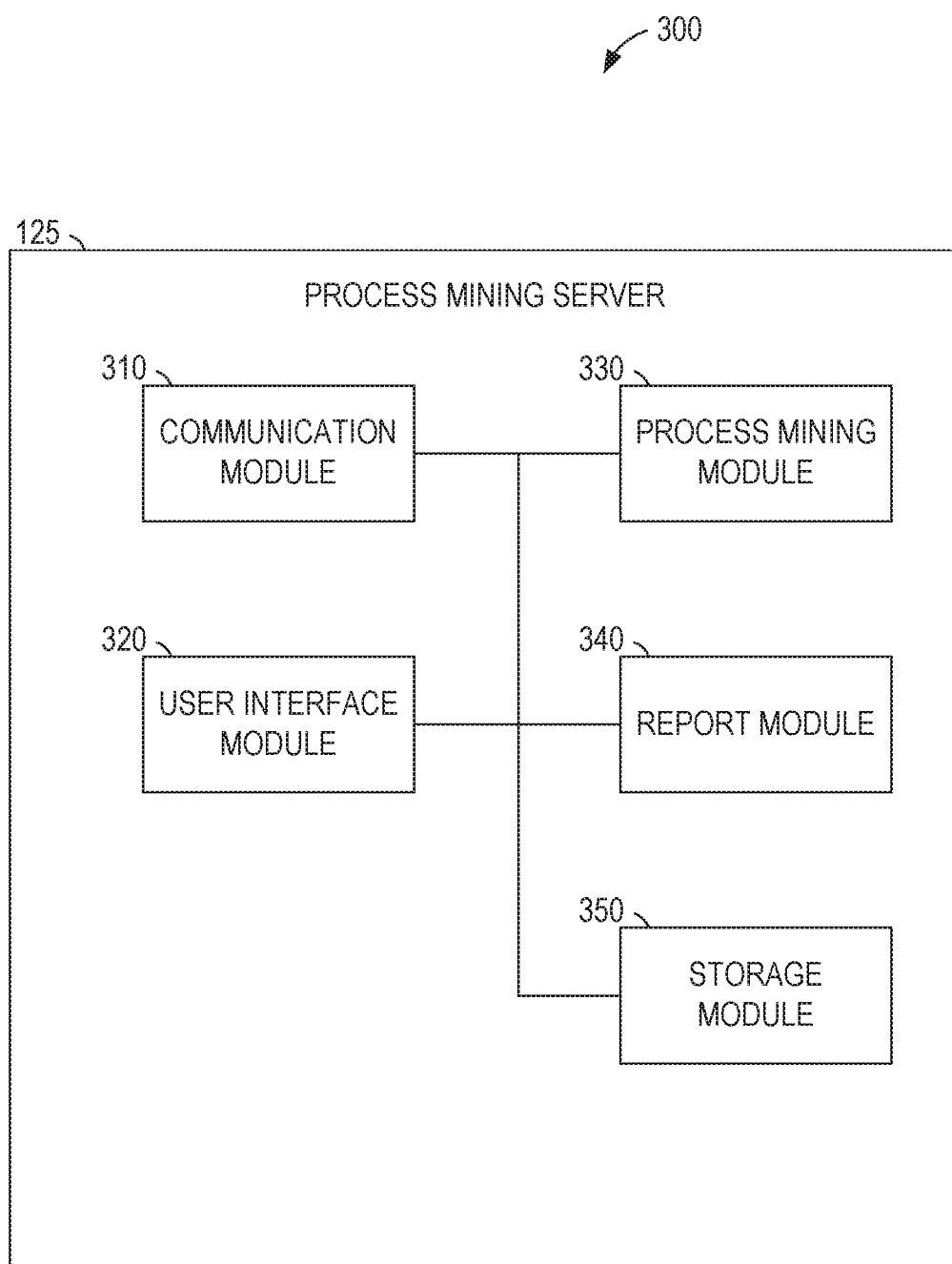
FIG. 3 is a block diagram of an application server, according to some example embodiments, suitable for frontend process mining.

FIG. 3 is a block diagram 300 of the process mining server 125, according to some example embodiments, suitable for frontend process mining. The process mining server 120 is shown as including a communication module 310, a UI module 320, a process mining module 330, a report module 340, and a storage module 350, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 receives data sent to the process mining server 120 and transmits data from the process mining server 120. For example, the communication module 310 may receive, from the client device 160, a frontend process mining data. The communication module 310 provides the frontend process mining data to the process mining module 330, stores submitted data in the database of the database server 130 via the storage module 350, or any suitable combination thereof.

The process mining module 330 receives frontend process mining data from the client device 160 (e.g., the process mining module 330 may request the frontend process mining data, the client device 160 may push the frontend process mining data, or both). In some example embodiments, the frontend process mining data is received via the communication module 310 and stored in a database via the storage module 350. After being stored, the data may be accessed from the database. Communications sent and received by the communication module 210 may be intermediated by the network 190.

The UI module 320 causes presentation of a UI for the process mining server 125 on a display associated with an administrator of the process. The UI allows a user to select a process or a process instance from a list of processes or process instances, to view process mining data for the selected process or process instance, to modify a process, or any suitable combination thereof.

The report module 340 generates a report based on process mining data analyzed by the process mining module 330. For example, multiple users on different client devices 160 each interact with different UIs while working on a single business process (e.g., an accounts receivable process). Data gathered during each interaction is stored by the process mining module 330 as the process mining data 150 of the database server 130. The gathered data is analyzed by the process mining module 330 and a UI is identified that has a substantially higher than average number of interactions with a particular data entry field. As an example, identification of such a UI is performed by comparing weekly averages of how long each process step takes and determining that an anomaly is present when a process step varies from the average by 20% or more. In response to the detection of this anomaly, the process mining module 330 causes the report module 340 to generate a report (e.g., in an email or text message) and to send the report to an administrative account.

FIGS. 4-5 are block diagrams of a database schema 400, according to some example embodiments, suitable for frontend process mining. The database schema 400 includes a mined data table 410, a business object table 440, an event type table 470, a process type table 510, and a user table 540.

The mined data table 410 includes rows 430A, 430B, 430C, and 430D of a format 420. The business object table 440 includes rows 460A and 460B of a format 450. The event type table 470 includes rows 490A, 490B, 490C, and 490D of a format 480. The process type table 510 includes rows 530A and 530B of a format 520. The user table 540 includes rows 560A, 560B, and 560C of a format 550.

The format 420 of the mined data table 410 includes an object identifier field, a client identifier field, a user identifier field, an event type identifier field, a duration field, and a clickstream field. Each of the rows 430A-430D stores mined data for a single event (e.g., updating data for an order). The event may consist of multiple field changes (e.g., changing a Value, Due Date, and Address of an order). The event type identifier identifies the type of the event. For example, the event type identifier may identify the UI through which the user interaction was received. The object identifier identifies the business object to which the event was applied. For example, in an invoice generation UI, the same event type identifier would be used for the data entry of the payer of the interface on multiple invoices, but the object identifier would be different for each invoice. The client identifier identifies the client device 160 that generated the event (e.g., with an Internet protocol (IP) address or other identifier). The user identifier identifies a user account associated with the event (e.g., a user account of the client device 160 that was logged in at the time the event was generated). The duration field indicates an amount of time associated with the event (e.g., a number of seconds elapsed between the providing of a UI and completion of the event (e.g., the time of receipt of the last interaction that is part of updating the data for the order)).

The clickstream field of the rows 430A-430D stores the mined frontend interaction data for the event. The clickstream field includes times and positions of mouse clicks; times, fields, and characters of text entered; times and positions of checkboxes checked; or any suitable combination thereof.

The format 450 of the business object table 440 includes an object identifier field and an object type field. Thus, the object type for a business object can be determined by looking up the object identifier in the business object table 440. By reference to the rows 460A and 460B of the business object table 440, the business object of the rows 430A-430C is an invoice object and the business object of the row 430D is a customer object.

The rows 490A, 490B, 490C, and 490D of the event type table 470 are in the format 480, including an event type identifier and an event description. Thus, the event description for an event can be determined by looking up the event type identifier in the event type table 470. By reference to the rows 490A-490C of the event type table 470, the business process for the invoice of the rows 430A-430C includes events to create an invoice, change a baseline date, and pay an invoice. By reference to the row 490D, the business process for the customer of the row 430D includes an event to change an address.

The format 520 of the process type table 510 includes an object type field and a process type field. Thus, the type of business process performed is determined by the type of business object being manipulated. As indicated by the rows 530A and 530B, an invoice business object is used in an accounts receivable process and a customer business object is used in a customer management process.

The rows 560A, 560B, and 560C of the user table 540 are in the format 550, including a user identifier and a user name. Thus, by cross-referencing the event type table 470 with the user table 540, the names of users generating events are revealed. In some example embodiments, user-identifying information is removed to ensure that information is generated in the aggregate without embarrassing individual users.

Figure 6:
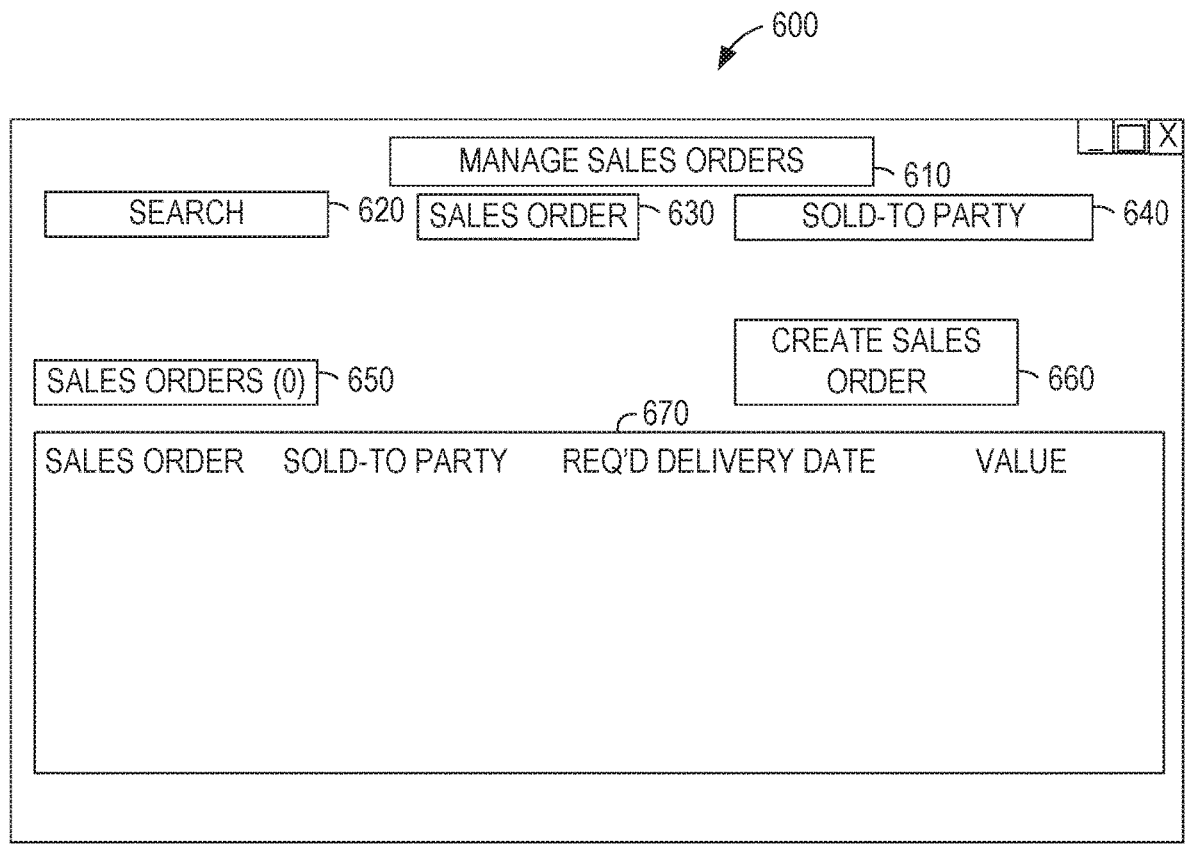
FIG. 6 is a diagram of a UI in a process suitable for frontend process mining, according to some example embodiments.

FIG. 6 is a diagram of a UI 600 in a process suitable for frontend process mining, according to some example embodiments. The UI 600 includes a title 610; fields 620, 630, and 640; text 650; a button 660; and an information area 670. The title 610 indicates that the UI 600 is for managing sales orders. The fields 620-640 are operable to receive search terms for filtering sales order data presented in the information area 670. The text 650 indicates that the information area 670 contains sales order data and provides the number of sales orders included in the information area 670. The button 660 is operable to create a sales order. The information area 670 provides a sales order identifier, a name of the sold-to party, a required delivery date, and a value for each sales order responsive to the search terms. The search terms include plain-text search (in the field 620), sales order identifier search (in the field 630), and sold-to party search (in the field 640).

Figure 7:
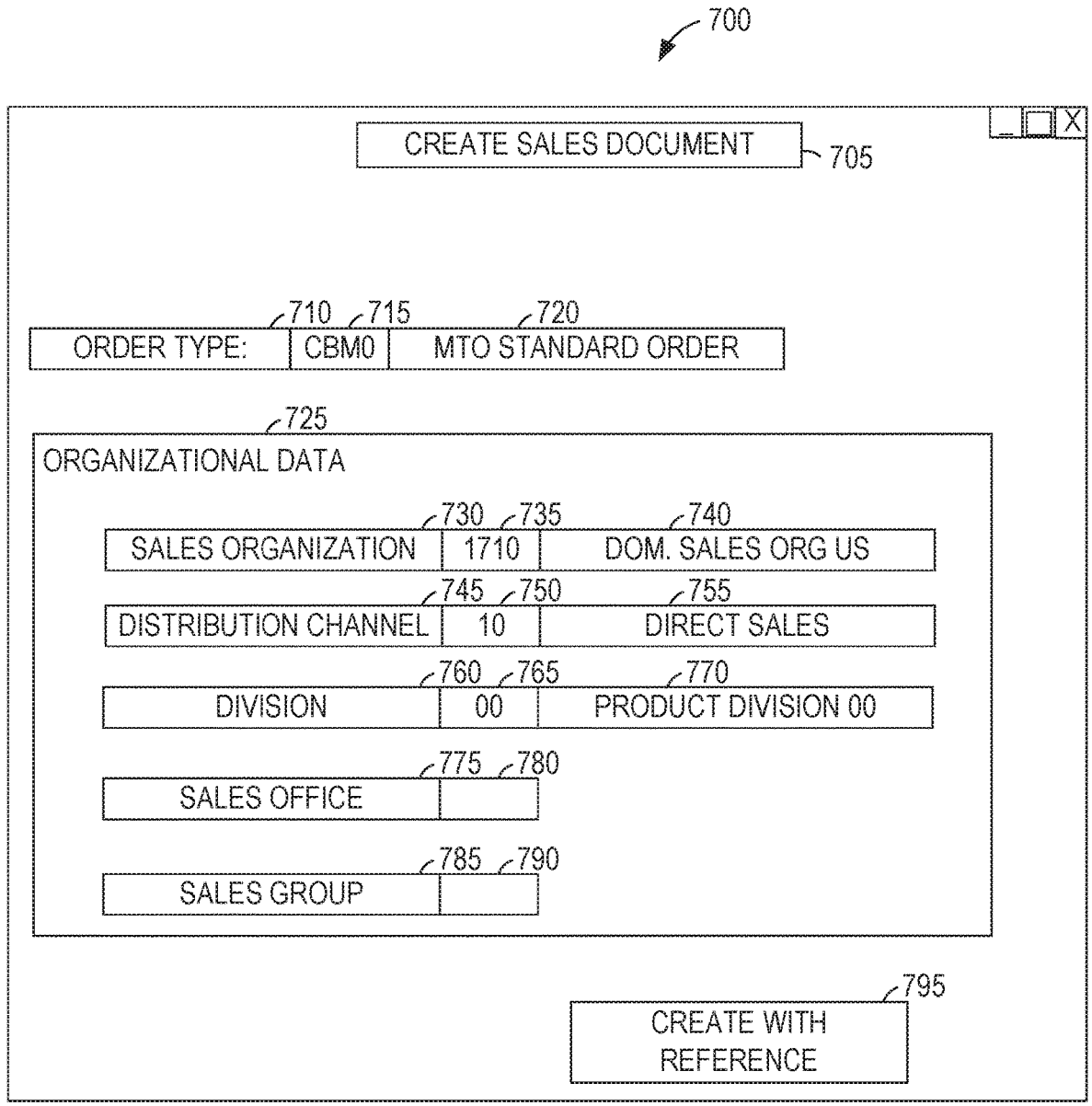
FIG. 7 is a diagram of a UI in a process suitable for frontend process mining, according to some example embodiments.

FIG. 7 is a diagram of a UI 700 in a process suitable for frontend process mining, according to some example embodiments. The UI 700 includes a title 705; indicators 710, 730, 745, 760, 775, and 785; fields 715, 735, 750, 765, 780, and 790; descriptors 720, 740, 755, and 770; data area 725; and button 795. The title 705 indicates that the UI 700 is for creating a sales document. Thus, the UI 700 may be displayed in response to operation of the button 660 of the UI 600. The button 795 is operable to complete the sales document with reference to an already-existing quotation.

The indicator 710 indicates that the field 715 defines the order type of the sales document. The descriptor 720 provides a description of the order type indicated in the field 715. The fields 715, 735, 750, 765, 780, and 790 may be implemented as text fields, drop-down lists, combo boxes, or any suitable combination thereof.

The data area 725 contains indicators, descriptors, and fields for the order. The sales organization type (indicator 730) is 1710 (field 735), which is a domestic sales organization in the United States (descriptor 740). The distribution channel type (indicator 745) is 10 (field 750), which is a direct sales channel (descriptor 755). The division selling the items sold (indicator 760) is 00 (field 765), product division 00 (descriptor 770). The sales office (indicator 775) and sales group (indicator 785) have not yet been filled in (fields 780 and 790), and thus do not have corresponding descriptors.

FIG. 8 is a diagram of a UI 800 in a process suitable for frontend process mining, according to some example embodiments. The UI 800 includes a title 805; indicators 810, 830, 845, 860, 875, and 885; fields 815, 825, 835, 840, 850, 865, 880, and 890; and descriptors 820, 855, and 870. The title 805 indicates that the UI 800 is for creating a standard order. The UI 800 may be displayed in response to operation of the button 795 of the UI 700.

The indicator 810 indicates that the field 815 defines the quotation on which the sales order is to be based. The data shown in the fields 825, 835, 840, 850, 865, 880, and 890 are populated by the application server 120 based on the quotation identified in the field 815. The fields 825, 835, 840, 850, 865, 880, and 890 may also receive user input to change the data from the quotation for the sales order.

As shown in the example UI 800, the order type (field 825) is a standard order (descriptor 820); the net value of the order (indicator 830) is $353.50 (fields 835 and 840); the sold-to party (indicator 845) has identifier 1710005 (field 850) and is a domestic U.S. customer located on 2nd Avenue in Billings, Mont. (descriptor 855); the ship-to party (indicator 860) is the same as the sold-to party (field 865) with the same description (descriptor 870); the customer reference identifier (indicator 875) is CR1709011 (field 880); and the required delivery date (indicator 885) is Dec. 21, 2017 (field 890).

Figure 9:
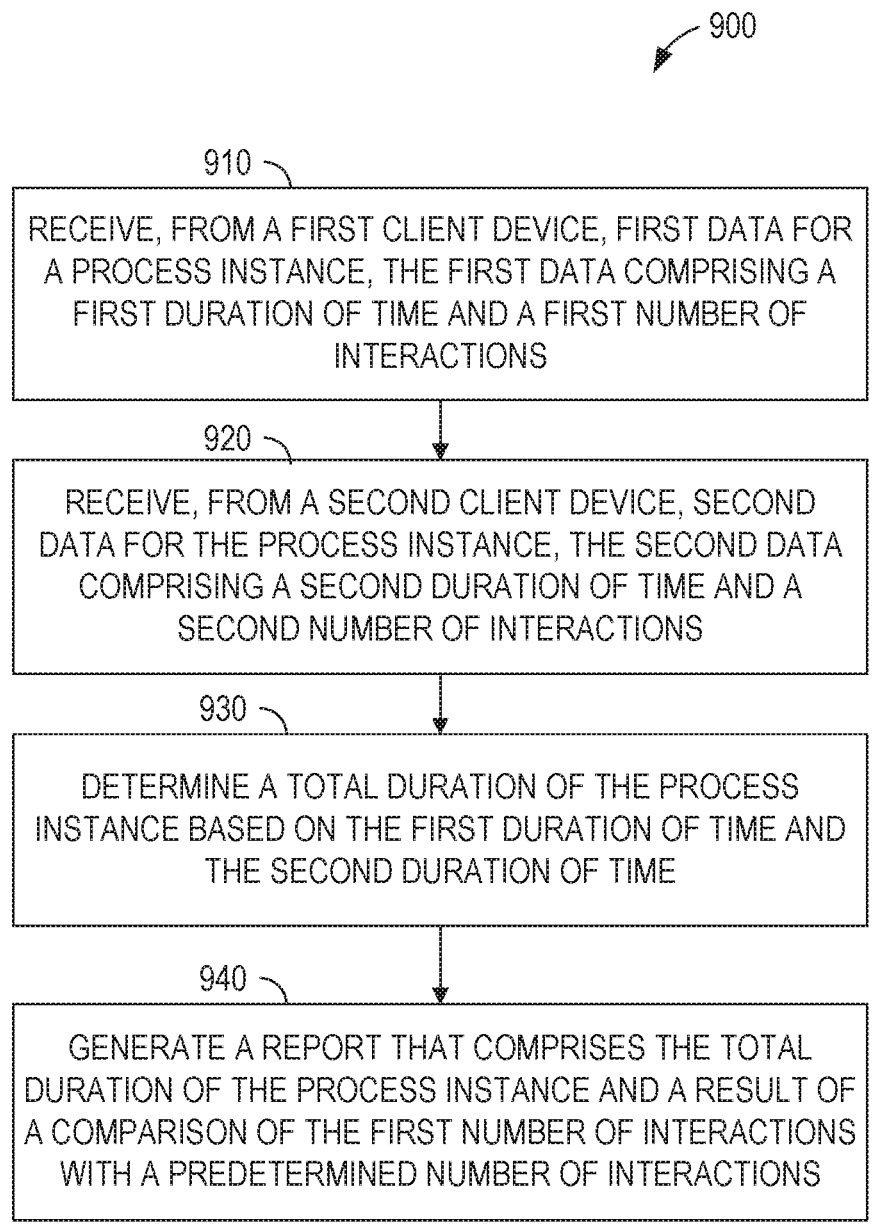
FIG. 9 is a flowchart illustrating operations of a method suitable for frontend process mining, according to some example embodiments.

FIG. 9 is a flowchart illustrating operations of a method 900 suitable for frontend process mining, according to some example embodiments. The method 900 includes operations 910, 920, 930, and 940. By way of example and not limitation, the method 900 is described as being performed by the devices, modules, and databases of FIGS. 1-5.

In operation 910, the process mining module 330 receives, from a first client device (e.g., the client device 160A), first data for a process instance, the first data comprising a first duration of time and a first number of interactions. In an example embodiment, a user of the client device 160A enters, in a UI, quotation data for a sales quote to a customer, in a step of a process of creating a sales order. The frontend capture module 230 of the client device 160A stores the duration of time and number of interactions of the user with the UI in the process of entering the quotation data. After the quotation data is entered, the process mining modules 230 and 330 communicate so that the application server 120 receives the data, including a process identifier for the process instance. The process instance identifier may be an identifier for a business object (e.g., in the business object table 440).

Alternatively or additionally, data is reported from the client device in response to an elapse of time or closing the UI instead of being reported in response to completion of a step in the business process. For example, if the business process step being attended to is entry of the quotation data shown in FIG. 8, the data received in operation 910 may be received after all quotation data is entered, or after a period of time is spent in the UI, or after the user closes the UI. In the latter two cases, the process mining data received reflects an incomplete task. Thus, in order for the process to be complete, a user will need to return to the UI and complete the incomplete step of the process. Nevertheless, by collecting these occurrences and correlating them with the process flow, hot spots of wasteful activities (e.g., activities which are started but canceled several times) can be identified and, subsequently, be addressed.

The frontend capture module 230 of the client device 160 captures data for provision in operation 910. In some example embodiments, the frontend capture module 230 uses an observation timer that begins at 0 at the time the UI is presented. Each time the user clicks on any element, the current timestamp, the location in the domain-object model (DOM) and the object are stored as well as any changes resulting from the interaction (e.g., state change of a checkbox or radio button). In some example embodiments, the frontend capture module 230 stores the whole DOM tree when the UI is first presented and after each interaction. By comparing the DOM tree from before the interaction with the DOM tree after the interaction, changes in the DOM tree caused by the interaction are determined. Additionally, each time the user uses the keyboard, this is also tracked— timestamp, raw data typed into the UI, which element in the UI was active at the time, and changes to the DOM caused by the keyboard use.

In operation 920, the process mining module 330 receives, from a second client device (e.g., the client device 160B), second data for the process instance, the second data comprising a second duration of time and a second number of interactions. In an example embodiment, a user of the client device 160B uses the UI 800 to complete the sales order with data pre-populated from the quotation data. The frontend capture module 230 of the client device 160B stores the duration of time and number of interactions of the user with the UI in the process of completing the sales order. After the sales order is complete, the process mining modules 230 and 330 communicate so that the application server 120 receives the data. The number of interactions received in operations 910 and 920 may be a number of mouse clicks, a number of paste operations, a number of touchscreen presses, a number of keystrokes, or any suitable combination thereof.

The process mining module 330 determines, in operation 930, a total duration of the process instance based on the first duration of time and the second duration of time. In some example embodiments, the process mining module 330 also determines a total number of user interactions in the process instance.

In operation 940, the report module 340 generates a report that comprises the total duration of the process instance and a result of a comparison of the first number of interactions with a predetermined number of interactions. For example, a design goal may be to keep the number of interactions with a UI less than twice the number of fields contained in the UI. In response to determining that the first number of interactions exceeds twice the number of fields in the first UI, the report module 340 generates a report indicating the problem and sends the report to an administrator (e.g., by sending an email to a predefined administrator email account). The frontend process mining system is also used to analyze the actual operational performance of the workforce of a company. For example, inefficient use of a UI may be dealt with my providing additional training for the users of that UI.

Thus, by use of the method 900, two interactions by two different client devices in a single process instance are aggregated to generate a report that applies to the entire process instance. By comparison with prior art systems that treated each UI or each client device independently, the method 900 better reflects the practical impact of system inefficiencies, allowing for better allocation of resources to address problems in processes.

Though the method 900 is described as combining information from two users on two client devices, information may be aggregated from any number of devices by repeating operation 920 for additional data from additional (or the same) devices and including that data in the determining of the duration of the process in operation 930. For example, after the second client device performs (or begins to perform) a step in the process instance, the first client device may perform another step or re-perform the first step (i.e., perform rework or complete an incomplete task). As another example, after the second client device performs a step in the process instance, a third user of a third client device may perform another step in the process instance.

Further, the method 900 is described as addressing a single process instance, but processes may include optional or alternative steps that are not preformed in every iteration of the process. Accordingly, multiple execution paths for the process may exist. Over time, the complete state space of the process is observed and mapped using this approach. Thus, the frontend process mining solution described herein is automated and scalable. Every state the process can be in during its execution and all the different activities that have been observed in their varying frequencies in these states are combined into a process graph. The process graph comprises activities as vertices and relations between activities as edges. Based on the process graph, a heatmap-like indication of anomalies is generated (e.g., indications of where a lot of rework happens to indicate where the customer should invest money and effort to investigate and solve the underlying issue).

By collecting the frontend process data, the frontend process mining server 125 provides analytics over sets of observations belonging to one process step. For instance, after having observed "Change Due Date" in Accounts Receivable 250 times, the frontend process mining server 125 provides averages and standard deviations for (but not limited to): Duration between start and completion of the activity, number of clicks, number of typed characters, number of context switches (Alt+Tab on Windows), number of COPY actions (Ctrl+C on Windows), number of PASTE actions (Ctrl+V on Windows), number of PASTE actions where the pasted content came from somewhere else (e.g., in the UI, we observed a PASTE, but the COPY took place in another application such as Excel). This indicates that the UI requires information from another source. Based on frontend mining, we can analyze whether the values pasted in this UI are identical each time, whether they are values from a small set (e.g., of less than 10 values) or if this is free text. Additionally, repeatability (percentage of how many times the input differs only marginally) is determined as an indication of how easy it would be to automate the process activity.

Some applications list several different instances of the same type of business object. For these applications, a new UI interaction and process step starts as soon as the user selects another business object instance (e.g., the first invoice in a list of invoices). The user actions are saved while the user is interacting with the selected business object instance (e.g., setting three fields of the invoice). When the user saves or submits the changes and selects the next business object instance (e.g., the second invoice in the list), a new activity in another process instance begins. For both distinct activities, the frontend capture module 230 captures the data to recognize the process instance (e.g., invoice identifier), identify the changes created by the user, and store the complete clickstream of the users actions in creating the changes.

Figure 10:
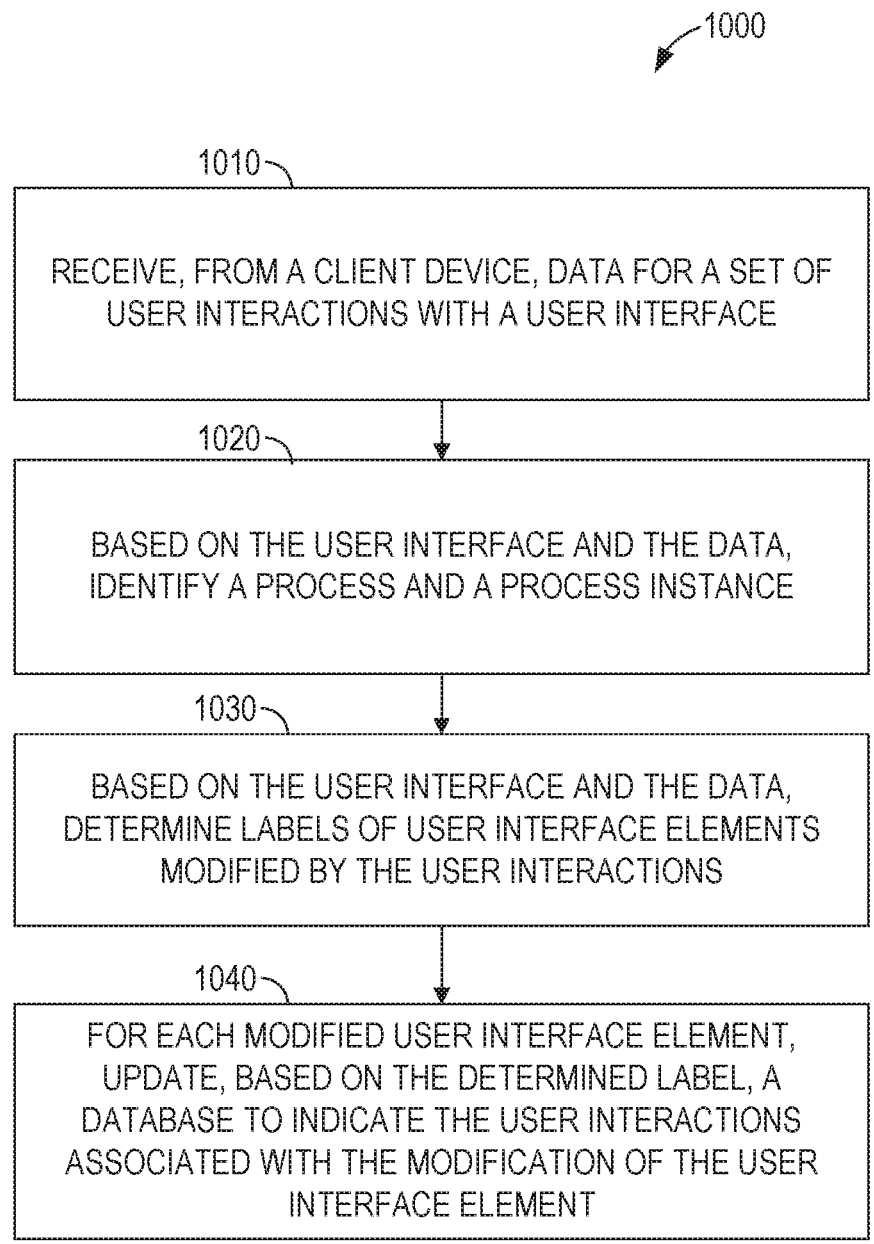
FIG. 10 is a flowchart illustrating operations of a method suitable for frontend process mining, according to some example embodiments.

FIG. 10 is a flowchart illustrating operations of a method 1000 suitable for frontend process mining, according to some example embodiments. The method 1000 is an example implementation of operation 910 and includes operations 1010, 1020, 1030, and 1040. By way of example and not limitation, the method 1000 is described as being performed by the devices, modules, and databases of FIGS. 1-5.

In operation 1010, the process mining module 330 receives, from a client device, data for a set of user interactions with a UI. In some example embodiments, DOM data for the UI is received. The DOM data identifies the UI (e.g., via a "title" element) and the elements of the UI (e.g., text display elements, text input fields, drop-down selectors, text input fields, and the like). The DOM data also identifies interrelationships between the UI elements. For example, the relationship between a text display element and a text input field that are contained within a single container object are included in the DOM data.

The data for the set of user interactions identifies types of interactions (e.g., clicks, keypresses, menu selections, and the like) and the UI element with which each interaction is associated. In some example embodiments, a timestamp for each user interaction is included in the data. Thus, analysis of the data received in operation 1010 allows for reconstruction of the sequence of interactions with the UI, the amount of time taken in interacting with each UI element, the number of times a single UI element is interacted with, and so on.

In operation 1020, based on the UI and the data, the process mining module 330 identifies a process and a process instance. In some example embodiments, a title of the UI is retrieved from the DOM data and a text search is performed on the title. If the title includes the name of a business object, the business object is identified for the UI. For example, UIs entitled "Create Invoice," "Pay Invoice," and "Edit Invoice" all match the text "Invoice," which is the name of a type of object (as shown in the process type table 510 of FIG. 5). Using the process type table 510, the process mining module 330 determines that the process type for all three of these UIs is "Accounts Receivable." In some example embodiments, a dictionary of synonyms is used if no object type names match the title. For example, "bill" may be listed as a synonym for "invoice," allowing a UI entitled "Update Bill" to be found as a match for an invoice business object in operation 1020.

The process instance is determined based on the specific data being manipulated by the UI. After determining that the primary business object being manipulated is an invoice, the DOM data is searched to find an identifier of an invoice. Thus, the process instance corresponds to the specific business object being manipulated and the process corresponds to the type of business object being manipulated.

In operation 1030, based on the UI and the data, the process mining module 330 determines labels of UI elements modified by the user interactions. In some example embodiments, the data received in operation 1010 is of the form <element identifier>, <timestamp>, <interaction type>, <interaction data>. In these example embodiments, the element identifier is a label of a UI element or is an identifier used to look up the label. In other example embodiments, a location in the UI is received instead of an element identifier. In these example embodiments, a simulated rendering of the UI is performed to determine which UI element corresponds to the location, thus enabling determination of the label of the UI element. In some example embodiments, operations 1010-1030 are performed by the client device prior to transmitting the data to the application server 120.

For each modified UI element, the process mining module 330 updates, based on the determined label, a database to indicate the user interactions associated with the modification of the UI element (operation 1040). For example, rows in the mined data table 410 may be added, storing the object identifier for the process instance, the event type identifier for the identified UI element and the type of interaction, and additional fields describing the interaction (e.g., the timestamp of the interaction, the keystroke(s) of the interaction, the location within the UI element of a click, or any suitable combination thereof). To protect user privacy, the client identifier and the user identifier may not be stored in the mined data table 410.

FIG. 10 is a diagram of a UI 1000 suitable for presenting results of frontend process mining, according to some example embodiments. The UI 1000 includes a title 1010; headers 1220, 1230, and 1240; and result rows 1250A, 1250B, 1250C, 1250D, and 1250E. The title 1010 indicates that the UI 1000 is displaying results of analysis for an order process. The UI 1000 is generated using the data gathered by the methods 900, 1000, or both.

The headers 1220-1240 indicate that each of the result rows 1250A-1250E includes a time percentage and a rework percentage for each UI in the order process. The time percentage indicates the percentage of the total time spent on the process that is spent in the indicated UI. Thus, the time percentage fields add up to 100% (subject to rounding errors). The rework percentage indicates the percentage of time spent in the indicated UI that is spent on rework (e.g., changing already-entered data). If all data is entered correctly the first time, the rework percentage for each UI will be 0%. As can be seen from the result rows 1250A-1250E, the "Create Sales Order" UI takes the most time for the process (30%) and has the highest rework percentage (16%). Accordingly, attention should be paid to the design of this UI and to the training of users of this UI.

Continuous monitoring allows for (close to real-time) dashboards with heatmaps for processes and their steps. This will also enable the monitoring and tracking of change initiatives. The UI 1000 is an example of such a continuous monitoring dashboard. As additional information is gathered using frontend process mining for the order process, the rows 1250A-1250E are updated by the process mining server 125. Additional rows are added in response to detection of additional UIs that are part of the order process, existing rows are removed in response to detecting that the time percentage for the UI is 0% over a predetermined period of time (e.g., one week or one month), or both.

Using the data gathered by the methods 900, 1000, or both, improvements to UIs are made. Example improvements include adapting UIs based on actual usage data, identifying automation potential, providing end user guidance to reduce errors, optimizing business processes by detecting external interactions, detecting relations between software systems, benchmarking, streamlining business interactions, using anomaly detection for real-time feedback, determining educational needs, and reducing the use of custom code.

To adapt UIs based on actual usage data, clickflows, text inputs, field changes, reoccurring text inputs, and timing information are captured. Based on this data for a specific activity that was observed thousands of times, buttons that are never used and value combinations that are inserted together are identified. Unused buttons are removed in an unobtrusive way by keeping the general layout of the UI. For example, a reduced UI variation is derived that hides all actionable UI elements which are not used in at least a threshold percentage (e.g., 99%) of the observations, and a checkbox is inserted (e.g., a checkbox labeled, "Advanced View") which ensures that all the hidden UI elements re-appear at the same spot they occupied before. Hiding the elements can be achieved by introducing cascading style sheet (CSS) commands that remove these elements with a simple toggle to show them again. Additionally or alternatively, items that are always (or in at least a threshold percentage of cases) manually clicked anyway are preselected instead of defaulting to be unselected. The default size of lists or tables is optimized based on how often the user scrolls/paginates.

Adapting the UIs based on actual usage data may include making template suggestions, such as, for example, automatically creating an alternative UI based on observed behavior by providing fewer options and buttons along with shorter ways between the most important (e.g., most clicked) elements of the UI. This alternative UI is automatically deployed to half of the users for A/B testing. After one week, the results of the A/B testing are evaluated to determine whether the alternative UI performs better (e.g., based on number of clicks required, total time consumed in completing the process, or any suitable combination thereof).

Additionally or alternatively, adapting the UIs based on actual usage data may include optimizing technical parts of the UI implementation. For example, based on the sequence in which UI elements of the UI are accessed by users, the later-accessed portions are loaded lazily and the immediately-accessed portions are loaded on initial page load to optimize responsiveness and user experience. As another example, pre-fetching of content is optimized (e.g., if the user always (or more than a predetermined percentage of the time) scrolls through a whole list, the list is pre-fetched rather than paginated).

To identify automation potential, the captured data is analyzed to obtain all the different real-life variations of processes running inside the company (at least the parts covered by UI interactions). Using prior art systems, individuals identify processes that appear to be inefficient. However, there is no objective, reliable, simple, and inexpensive way of identifying which processes should be focused on and which steps to automate. Frontend process mining can provide a heatmap of all (UI-based) activities of a process. While backend mining only provides information what was done when within a process, our approach provides the actual effort and can even classify the automation potential of these activities based on the similarity of all observations of the activity.

The average duration of an activity, multiplied by the number of observations of the activity within a month, multiplied by the average wage of someone doing the activity provides a monthly cost value for the activity. Repeating this calculation for each activity within a process gives a total cost of the process and an activity-by-activity breakdown of the cost. The costs of multiple processes can be further aggregated, if desired (e.g., to show the relative process costs of different lines of business, to show the relative process costs of different regions or countries, to show the relative process costs of specialized departments, or any suitable combination thereof).

To determine automation potential, the average number of clicks and amount of free text entered is analyzed. A UI with no free text (or always the same text) and few clicks (mostly the same checkboxes) has high automation potential. A UI with only a few variations of text in free text fields and only a few clicks and options chosen has medium automation potential. A more complex example of medium automation potential is where two fields have a high correlation. For example, a text field for a country has a finite number of options; a text field for area code has a very high number of options, but correlates to the country. Accordingly, the area code input could be partially automated by being converted to a combo box with contents based on the country selected in the country field. A UI with many free text fields and where most observations of this activity contained unique text these fields has low automation potential.

The combination of the cost insight and the automation potential insight is then used to create a business case for automating process steps. For example, the process Accounts Receivable costs roughly $1.4 M each year (=4000 person hours of effort each month*$30/hour*12 months). In this example, the process has three activities with high automation potential (90%) which cause half the effort ($700 k). Thus, we can spend up to $700 k on automating these three activities, e.g., via robotic process automation (RPA), which amortizes within one year. These insights into how people are executing processes within a company are unique, and can be elicited scalably in an automated fashion.

People in large organizations repeat the same mistakes all the time —tidying up after them is expensive and tiresome. By "learning from past mistakes" observed in already processed process instances, the root causes of the errors can be addressed much earlier in the process, reducing costs. A machine learning model can correlate the rework observed (which values needed to be changed) to the process step which originally inserted these values—this machine learning model can provide a prediction of how likely it is that the entered value will need to be changed later on. This prediction can happen even in the execution of the identified originating process step, which can trigger the user entering the data to change it (if necessary), thereby potentially eliminating the need for more expensive rework later in the process. If a strong correlation between rework and a specific process step is found by a machine learning model, this model can be used to make predictions for inputs of the specific process step UI as part of the data validation before it is committed to the server—the user gets a simple notification next to the input field that the value/text entered is likely to cause rework and that it should be checked again. The user can still ignore this notification and continue, which, if the rework is not required, can be used as a counter example when re-training the machine-learning model.

The same is possible not only for rework, but also for values correlating with other undesired process paths. Such process paths are the ones that include rework or long delays in the execution of the process instance. Notifications for such scenarios are, for instance: "If your purchase order has less than $149, it will be processed in half the time," or "If you add 39 more characters in the description field Reason for Purchase, it is twice as likely to be accepted." Thus, specific notifications may be automatically generated based on observed past behaviors within the process, wherein the observations were obtained using frontend process mining.

Based on correlations found in the data, the frontend process mining module 330 creates a success metric to identify which process flows are the most beneficial for the company (e.g., least amount of rework required, lowest cost to the company, fewest customer complaints, or any suitable combination thereof), correlates what the users did in the UIs in these process instances, and identifies significant differences between the most and least beneficial. The success metric ensures that correlations which are obviously bad can be filtered out (example for a bad correlation: "If you remove the content of the description field, your invoice will be processed in half the time"—because it will be rejected, which is not scored positively in the success metric). Based on these insights, the frontend process mining module 330 creates a validator for the UI that provides a probability for each possible process flow and checks which changes would be required in the activity the user currently performs. If the user is not on an optimal path, a notification that proposes an action to increase the probability for an optimal process path is presented.

Standard process mining is usually based on event logs of some software system. This is often not sufficient to capture the whole business process. People may use other resources as part of their daily work, e.g., web-based tools such as search engines, currency converters, and translators. In contrast to traditional logfile-based backend process mining, frontend process mining will also detect these events. For example, detecting keypresses allows detection of commands like Alt-Tab to change browser tabs and Ctrl-V to paste text instead of typing directly into a text box. As a result, frontend process mining detects the pasting of data from other sources, which backend process mining cannot detect. When the application provided is the web browser, the URL of the site providing the text can also be determined. Repeated patterns such as Alt-Tab, Ctrl-V indicate a process step where an integration into another system is missing. By contrast, backend process mining has no information on how the user input data and thus cannot detect that integration with another system would be helpful. This additional information provides additional opportunity for optimizing business processes and increasing user efficiency. For example, if users often do currency conversion when performing a specific task, the UI is modified to include different currencies, improving efficiency and consistency, and reducing exposure of data to third parties.

Often, software systems are not integrated, yet they are used in the same business process. Frontend process mining enables detection of relations between software systems that are hard to detect in the backend. Based on the detected relationships, systems are integrated to improve efficiency. If systems are not integrated, it is hard to detect overarching business processes by analyzing backend logs because events in different software systems cannot be correlated (or at least not reliably). Frontend process mining closes this gap as the user is the one integrating different software systems. For example, within one company, invoices are received using software system A and are paid using software system B. The two software systems are not integrated in the backend, but the user opens the UIs of both software systems (in the same browser) and copies data from A to B. Frontend mining can detect such data transfer actions that are not easily comprehensible or automatically mappable from backend logs alone. Based on the observations, the systems are integrated, allowing reduction of errors by replacing human tasks (e.g., the copying and pasting of data) by automated actions.

Frontend process mining data may be shared among multiple companies, allowing comparison of the user interactions and processes of different companies. Similarly, by running the approach globally within a company, the same can be done to compare and benchmark different subsidiaries or locations within a company, e.g., in Germany, the process has usually two more steps but is 5% faster and requires less clicks than in France. This data is used for determining best practices and encouraging alignment of processes in different companies, subsidiaries, or locations.

Similarly, frontend process mining allows business partnerships to share data for processes that are jointly performed. By combining data about the frontend user efforts with business objects from the back-office software system, business interactions between organizations can be measured. This allows the management of the involved companies to focus on streamlining those work efforts in the partnership that cause the highest user efforts, i.e., that drive the highest costs.

Anomalies in real-time user interactions are used to detect fatigue and remind the user to take a break or switch tasks (e.g., in response to spending more than twice the average duration on a task, clicking next to buttons before actually hitting them on the second try, or any suitable combination thereof). Anomalies are also used to detect and prevent fraud (e.g., by detecting super-human speed when using the UI, unusually high value transactions, or both), to increase user satisfaction by helping them out in unusual situations (e.g., by providing help text for a user's first interaction with a UI and scaling the time spent by the first-time user when determining aggregate performance of the UI), and to highlight the fact that the user is entering unusual branches of a business process and guide him to avoid critical situations.

Frontend process mining can determine when the monthly average effort of a process step increases significantly (e.g., takes longer to complete the activity, more typing, more iterations in free text fields, or any suitable combination thereof). In response to a detected change in performance of a process step, an administrator is notified to encourage review of the process with the users. For example, new hires may not understand how to most efficiently use a particular UI and training would improve performance.

Frontend process mining creates a profile of which custom UIs are actually used. For example, if a custom UI that can modify 10 fields is only used for modifying the first one listed in the UI in 95% of the cases, frontend process mining can be used to simplify the custom UI. Additionally, based on the generated profile data for the custom UI, the users can be trained to achieve the same results using the standard UI, thereby allowing a customer to reduce the amount of custom code in the system. This is valuable for the customer since each update of the system could break any of the customizations, which makes them quite expensive to maintain. Additionally, the more custom code, the more effort and costs the customer will have in maintaining the custom code.

EXAMPLES

Example 1

A method comprising:
receiving, from a first client device and via a network, first data that comprises:
a process instance identifier for a process instance comprising a first task and a second task,
a first duration of time to perform the first task by a first user, and
a first number of interactions by the first user in performing the first task;
receiving, from a second client device via the network, second data that comprises:
the process instance identifier,
a second duration of time to perform the second task by a second user, and
a second number of interactions by the second user in performing the second task;
determining a total duration of the process instance based on the first duration of time and the second duration of time; and
generating a report that comprises:
a result of a comparison of the first number of interactions with a predetermined number of interactions, and
the total duration of the process instance.

Example 2

The method of example 1, further comprising:
receiving, from a third client device, third data that comprises:
the process instance identifier,
a third duration of time to perform a third task by a third user, and
a third number of interactions by the third user in performing the third task; and wherein
the determining of the total duration of the process instance is further based on the third duration of time.

Example 3

The method of example 2, wherein the third task is rework of the first task.

Example 4

The method of example 2, wherein:
the first task is incomplete; and
the third task completes the first task.

Example 5

The method of any of examples 1 to 4, wherein the first number of interactions comprises a number of mouse clicks.

Example 6

The method of any of examples 1 to 5, wherein the first number of interactions comprises a number of pastes of information.

Example 7

The method of any of examples 1 to 6, further comprising:
providing, to the first client device, instructions that, when executed by one or more processors of the first client device, cause the first client device to perform operations comprising:
displaying a user interface for performing the first task;
storing a timestamp for each user interaction with the user interface; and
transmitting the first data.

Example 8

A system comprising:
a memory that stores instructions; and
one or more processors configured by the instructions to perform operations comprising:
receiving, from a first client device and via a network, first data that comprises:
a process instance identifier for a process instance comprising a first task and a second task,
a first duration of time to perform the first task by a first user, and
a first number of interactions by the first user in performing the first task;
receiving, from a second client device via the network, second data that comprises:
the process instance identifier,
a second duration of time to perform the second task by a second user, and
a second number of interactions by the second user in performing the second task;
determining a total duration of the process based on the first duration of time and the second duration of time; and
generating a report that comprises:
a result of a comparison of the first number of interactions with a predetermined number of interactions, and
the total duration of the process instance.

Example 9

The system of example 8, wherein the operations further comprise:

receiving, from a third client device, third data that comprises:
the process instance identifier,
a third duration of time to perform a third task by a third user, and
a third number of interactions by the third user in performing the third task; and
wherein
the determining of the total duration of the process instance is further based on the third duration of time.

Example 10

The system of example 9, wherein the third task is rework of the first task.

Example 11

The system of example 9, wherein:
the first task is incomplete; and
the third task completes the first task.

Example 12

The system of any of examples 8 to 11, wherein the first number of interactions comprises a number of mouse clicks.

Example 13

The system of any of examples 8 to 12, wherein the first number of interactions comprises a number of pastes of information.

Example 14

The system of any of examples 8 to 13, wherein the operations further comprise:
providing, to the first client device, instructions that, when executed by one or more processors of the first client device, cause the first client device to perform operations comprising:
displaying a user interface for performing the first task;
storing a timestamp for each user interaction with the user interface; and
transmitting the first data.

Example 15

A non-transitory computer-readable medium that stores instructions that, when executed by one or more processors, cause the one or more processors to perform operations comprising:
receiving, from a first client device and via a network, first data that comprises:
a process instance identifier for a process instance comprising a first task and a second task,
a first duration of time to perform the first task by a first user, and
a first number of interactions by the first user in performing the first task;
receiving, from a second client device via the network, second data that comprises:
the process instance identifier,
a second duration of time to perform the second task by a second user, and
a second number of interactions by the second user in performing the second task;

determining a total duration of the process instance based on the first duration of time and the second duration of time; and
generating a report that comprises:
a result of a comparison of the first number of interactions with a predetermined number of interactions, and
the total duration of the process instance.

Example 16

The computer-readable medium of example 15, wherein the operations further comprise:
receiving, from a third client device, third data that comprises:
the process instance identifier,
a third duration of time to perform a third task by a third user, and
a third number of interactions by the third user in performing the third task; and
wherein
the determining of the total duration of the process instance is further based on the third duration of time.

Example 17

The computer-readable medium of example 16, wherein the third task is rework of the first task.

Example 18

The computer-readable medium of example 16, wherein:
the first task is incomplete; and
the third task completes the first task.

Example 19

The computer-readable medium of any of examples 15 to 18, wherein the first number of interactions comprises a number of mouse clicks.

Example 20

The computer-readable medium of any of examples 15 to 19, wherein the first number of interactions comprises a number of pastes of information.

Figure 12:
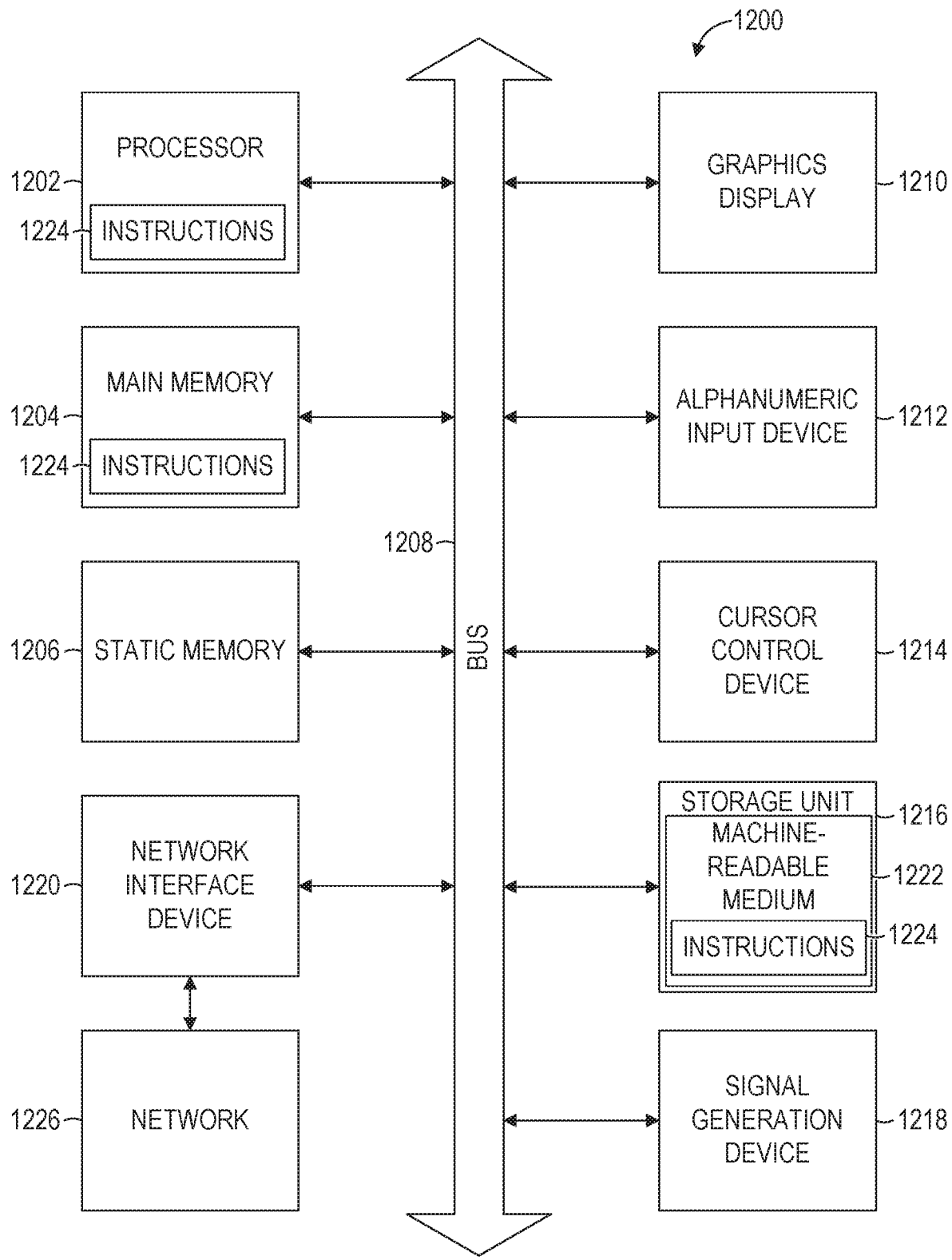
FIG. 12 is a block diagram illustrating components of a machine, according to some example embodiments.

FIG. 12 is a block diagram illustrating components of a machine 1200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 12 shows a diagrammatic representation of the machine 1200 in the example form of a computer system within which instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light-emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or another pointing instrument), a storage unit 1216, a signal generation device 1218 (e.g., a speaker), and a network interface device 1220.

The storage unit 1216 includes a machine-readable medium 1222 on which are stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 1200), such that the instructions, when executed by one or more processors of the machine (e.g., the processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, from a first client device and via a network, first data that comprises:
      a process instance identifier for a process instance comprising a first task and a second task,
      a first duration of time to perform the first task by a first user, and
      a first number of interactions by the first user in performing the first task;
   receiving, from a second client device and via the network, second data that comprises:
      the process instance identifier,
      a second duration of time to perform the second task by a second user, and
      a second number of interactions by the second user in performing the second task;
   determining, by one or more hardware processors, a total duration of the process instance based on the first duration of time and the second duration of time; and
   generating, by the one or more hardware processors, a report that comprises:
      a result of a comparison of the first number of interactions with a predetermined number of interactions, and
      the total duration of the process instance.

2. The method of claim 1, further comprising:
   receiving, from a third client device, third data that comprises:
      the process instance identifier,
      a third duration of time to perform a third task by a third user, and
      a third number of interactions by the third user in performing the third task; and wherein
   the determining of the total duration of the process instance is further based on the third duration of time.

3. The method of claim 2, wherein the third task is rework of the first task.

4. The method of claim 2, wherein:
   the first task is incomplete; and
   the third task completes the first task.

5. The method of claim 1, wherein the first number of interactions comprises a number of mouse clicks.

6. The method of claim 1, wherein the first number of interactions comprises a number of pastes of information.

7. The method of claim 1, further comprising:
   providing, to the first client device, instructions that, when executed by one or more processors of the first client device, cause the first client device to perform operations comprising:
      displaying a user interface for performing the first task;
      storing a timestamp for each user interaction with the user interface; and
      transmitting the first data.

8. A system comprising:
   a memory that stores instructions; and
   one or more processors configured by the instructions to perform operations comprising:
      receiving, from a first client device and via a network, first data that comprises:
         a process instance identifier for a process instance comprising a first task and a second task,
         a first duration of time to perform the first task by a first user, and
         a first number of interactions by the first user in performing the first task;
      receiving, from a second client device via the network, second data that comprises:
         the process instance identifier,
         a second duration of time to perform the second task by a second user, and
         a second number of interactions by the second user in performing the second task;
      determining a total duration of the process instance based on the first duration of time and the second duration of time; and
      generating a report that comprises:
         a result of a comparison of the first number of interactions with a predetermined number of interactions, and
         the total duration of the process instance.

9. The system of claim 8, wherein the operations further comprise:
   receiving, from a third client device, third data that comprises:
      the process instance identifier,
      a third duration of time to perform a third task by a third user, and
      a third number of interactions by the third user in performing the third task; and wherein
   the determining of the total duration of the process instance is further based on the third duration of time.

10. The system of claim 9, wherein the third task is rework of the first task.

11. The system of claim 9, wherein:
    the first task is incomplete; and
    the third task completes the first task.

12. The system of claim 8, wherein the first number of interactions comprises a number of mouse clicks.

13. The system of claim 8, wherein the first number of interactions comprises a number of pastes of information.

14. The system of claim 8, wherein the operations further comprise:
    providing, to the first client device, instructions that, when executed by one or more processors of the first client device, cause the first client device to perform operations comprising:
       displaying a user interface for performing the first task;
       storing a timestamp for each user interaction with the user interface; and
       transmitting the first data.

15. A non-transitory computer-readable medium that stores instructions that, when executed by one or more processors, cause the one or more processors to perform operations comprising:
- receiving, from a first client device and via a network, first data that comprises:
  - a process instance identifier for a process instance comprising a first task and a second task,
  - a first duration of time to perform the first task by a first user, and
  - a first number of interactions by the first user in performing the first task;
- receiving, from a second client device via the network, second data that comprises:
  - the process instance identifier,
  - a second duration of time to perform the second task by a second user, and
  - a second number of interactions by the second user in performing the second task;
- determining a total duration of the process based on the first duration of time and the second duration of time; and
- generating a report that comprises:
  - a result of a comparison of the first number of interactions with a predetermined number of interactions, and
  - the total duration of the process.

16. The computer-readable medium of claim 15, wherein the operations further comprise:
- receiving, from a third client device, third data that comprises:
  - the process instance identifier,
  - a third duration of time to perform a third task by a third user, and
  - a third number of interactions by the third user in performing the third task; and wherein
- the determining of the total duration of the process is further based on the third duration of time.

17. The computer-readable medium of claim 16, wherein the third task is rework of the first task.

18. The computer-readable medium of claim 16, wherein:
- the first task is incomplete; and
- the third task completes the first task.

19. The computer-readable medium of claim 15, wherein the first number of interactions comprises a number of mouse clicks.

20. The computer-readable medium of claim 15, wherein the first number of interactions comprises a number of pastes of information.

* * * * *